United States Patent [19]

Roseliep

[11] Patent Number: 5,315,750
[45] Date of Patent: May 31, 1994

[54] LOADING/UNLOADING SYSTEM FOR BROACHING MACHINE

[75] Inventor: Robert E. Roseliep, Grosse Pointe, Mich.

[73] Assignee: Utica Enterprises, Inc., Shelby Township, Utica County, Mich.

[21] Appl. No.: 625

[22] Filed: Jan. 5, 1993

[51] Int. Cl.$^5$ .................... B23Q 7/02; B23D 41/00
[52] U.S. Cl. .................... 29/563; 409/244; 409/251; 409/262; 409/263; 414/750
[58] Field of Search .................... 29/563, 564; 483/28; 414/750, 222, 591; 198/793; 409/244, 250, 251, 252, 263, 268, 269, 275, 276, 266, 272, 273

[56] References Cited

U.S. PATENT DOCUMENTS

| | | | |
|---|---|---|---|
| 1,627,755 | 5/1927 | Urschel | 409/249 |
| 2,307,228 | 1/1943 | Monroe | 409/273 X |
| 3,887,084 | 6/1975 | Gallo et al. | 414/591 X |
| 3,913,271 | 10/1975 | Boettcher | 414/591 X |
| 3,980,182 | 9/1976 | Esser et al. | 414/750 |
| 4,281,960 | 8/1981 | Russell | 414/750 |
| 4,401,401 | 8/1983 | Roseliep | 409/244 |
| 4,432,130 | 2/1984 | Gabriele | 29/563 |
| 4,917,551 | 4/1990 | Roseliep | 409/263 X |
| 5,167,603 | 12/1992 | Iwaniuk et al. | 483/28 |

FOREIGN PATENT DOCUMENTS

| | | | |
|---|---|---|---|
| 119511 | 6/1986 | Japan | 29/563 |
| 732091 | 5/1980 | U.S.S.R. | 409/268 |
| 1214349 | 2/1986 | U.S.S.R. | 409/629 |
| 2134064 | 8/1984 | United Kingdom | 414/750 |

Primary Examiner—William Briggs
Attorney, Agent, or Firm—Remy J. VanOphem

[57] ABSTRACT

A blind spline broaching machine for machining splines as well as sprockets, keyways, gears, cams and contours on workpieces, such as shafts. The blind spline broaching machine of the preferred embodiment has dual rams reciprocable relative to a rotary dial. The rams hold a corresponding pair of workpieces, while the rotary dial supports one or more broaching tools. The rotary dial is rotatable to index the workpieces to and from the rams. The blind spline broaching machine also incorporates a part moving unit on its periphery, which enables the use of a single loading/unloading station at which workpieces are alternately loaded onto and unloaded from the rotary table. Because the workpieces are loaded and unloaded from the same location on the periphery of the blind spline broaching machine, the side of the blind spline broaching machine opposite the loading/unloading station remains open to permit ready access to the tooling and the interior structure of the blind spline broaching machine. In addition, only one conveyor system is required to transport workpieces to and from the blind spline broaching machine. As a result, the complexity of and the floor space required for the blind spline broaching machine is substantially reduced.

21 Claims, 3 Drawing Sheets

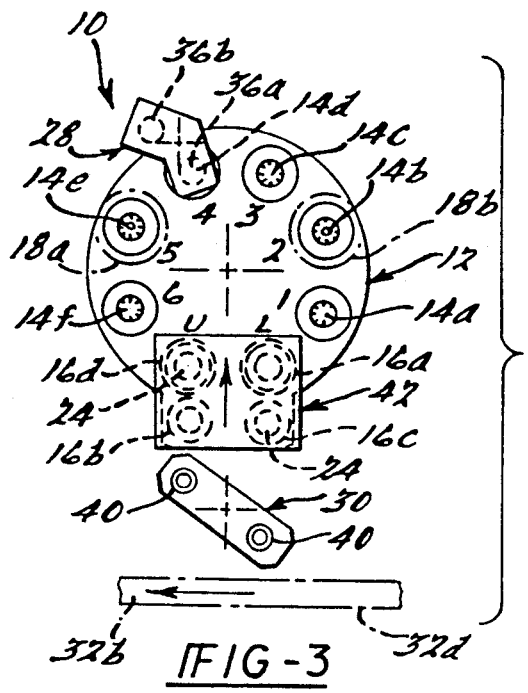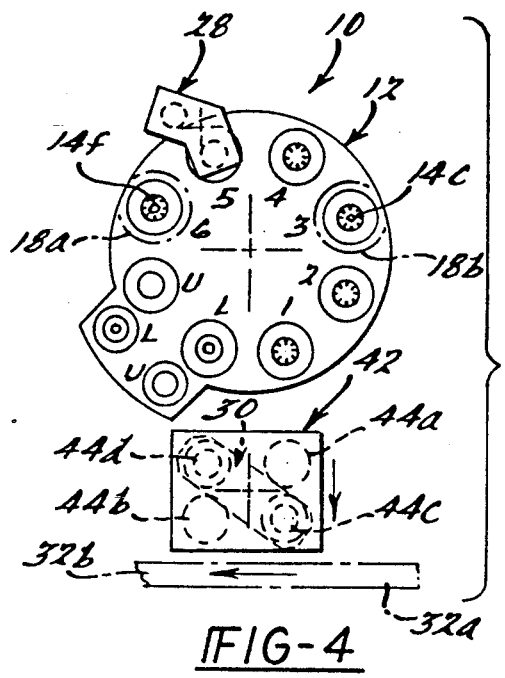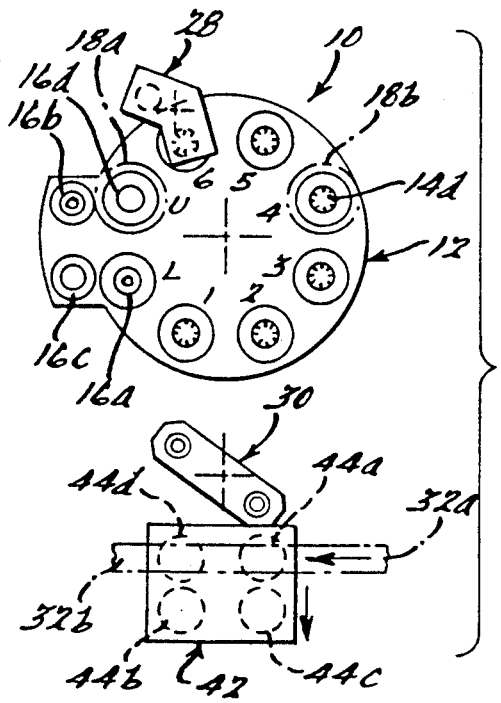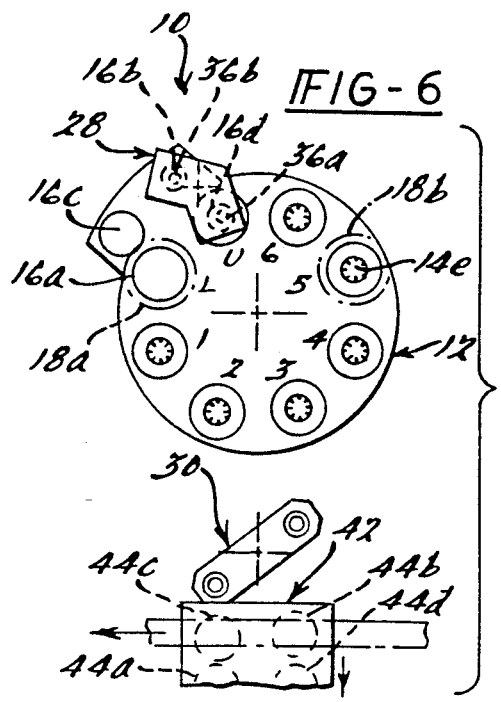

LOADING/UNLOADING SYSTEM FOR BROACHING MACHINE

BACKGROUND OF THE INVENTION

1. Field of the Invention

The present invention generally relates to broaching machinery, such as the type used to progressively broach blind splines on a workpiece. More specifically, this invention relates to a dual ram rotary blind spline broaching machine having a workpiece handling system which enables the workpieces to be loaded and unloaded at a single point along the periphery of the broaching machine table, such that easier access to the machine is provided for service and set-up, the workpiece handling system to and from the broaching machine is simplified, and the overall operating envelope of the broaching machine is reduced.

2. Description of the Prior Art

"Blind spline" broaching machines are used in the machining of splines on a workpiece, such as a shaft, which cannot be passed completely over or through a broach. Blind spline broaching machines are also suitable for forming other precision features, such as sprockets, keyways, gears, cams and contours. This type of broaching is particularly advantageous in the manufacture of precision parts in terms of machining time, which can be more than ten times faster than conventional operations, such as hobbing and shaping.

Conventionally, blind spline broaching consists of the movement of a workpiece through a series of tools which progressively remove material until the desired final dimensions are achieved. Typically, a workpiece is mounted to an indexing table which indexes the workpiece to each of a number of tools held in hydraulic rams. When its respective ram is actuated, a tool performs work on a workpiece, removing a specified amount of metal from the workpiece. The table is then indexed to align the workpiece with the next tool, and the cycle is repeated until the workpiece has encountered each tool and has been brought to its final size and shape.

Alternatively, it is known to locate the tools on the indexing table while mounting the workpieces on the hydraulic rams. An advantage here is that the number of hydraulic rams required is independent of the number of broaching operations desired. For instance, six broaching tools can be located on the indexing table while two rams, each holding a workpiece, can be actuated to broach the workpiece using two of the six tools. The table can then be indexed to align the next two tools with the workpieces until each workpiece is finished. The finished workpieces are then removed from the blind broaching machine in a preferably automated manner.

Because efficiency is increased when more than one workpiece is being machined at any given time, it is generally preferable to have more than one hydraulic ram. However, to maintain the size and complexity of a blind spline broaching machine, it is also preferable to limit the number of hydraulic rams. An illustrative example of this aspect is shown by a prior art blind spline broaching machine shown in FIG. 1. FIG. 1 is an overhead view of an indexing table 112 of a blind spline broaching machine 110. The indexing table 112 has six tool stations 114 (stations 114a through 114f) located along its periphery, along with two receptacles, referred to as "nests" 116a and 116b, for loading and unloading workpieces from the indexing table 112. Two hydraulic rams 118 are located above the indexing table 112 where indicated. The hydraulic rams 118 are diametrically opposite each other, and define two separate paths which the workpieces can take through the blind spline broaching machine 110.

For example, workpieces can pass through the blind spline broaching machine 110 by entering at a first loading station 120 and exiting at a first unloading station 122. Correspondingly, a second loading station 124 is located diametrically opposite the first loading station 120, at which other workpieces can enter the blind spline broaching machine 110. This second group of workpieces will exit the blind spline broaching machine 110 at a second unloading station 126, which is diametrically opposite the first unloading station 122. During a machining cycle, workpieces are loaded into the second nest 116b each time the second nest 116b is indexed to one of the load stations 120 and 124. Concurrently, two workpieces are held by each hydraulic ram 118 and, with each movement of the indexing table 112, the workpieces will be driven down to encounter one of the tools 114 on the indexing table 112. Once a workpiece has been broached in the last operation by the last tool 114f, the indexing table 112 is again indexed to permit the workpiece to be dropped into the first nest 116a. The subsequent indexing of the indexing table 112 will carry the machined workpiece toward one of the unload stations 122 and 126 while bringing the new workpiece into alignment with the hydraulic ram 118. The new workpiece will then be automatically secured to the hydraulic ram 118 and, with the next movement of the indexing table 112, will be machined by the successive tools 114a through 114f, starting with the tool station 114a and continuing to completion at the tool station 114f.

From the above discussion, it can be readily appreciated that the prior art blind spline broaching machines require two separate loading stations and two separate unloading stations, which must be spaced circumferentially around the blind spline broaching machine indexing table. As a result, the loading and unloading stations occupy a large portion of the circumferential space around the blind spline broaching machine, making access to the tools difficult for maintenance and repair. Further complicating the structure of the blind spline broaching machine is the requirement to have two completely separate conveyor systems to deliver and take away workpieces. As a result of the placement of the loading stations 120 and 124 and the unloading stations 122 and 126, two diametrically opposed delivery conveyors and two diametrically opposed return conveyors are required, which further obstruct access to the internal components of the blind spline broaching machine. Finally, the floor space required to accommodate the blind spline broaching machine is significantly increased due to the large amount of room required to accommodate two separate delivery and return conveyor systems. One way to greatly reduce the structure of the blind spline broaching machine would be to eliminate the need for two separate conveyor systems, while still retaining the capability to machine more than one workpiece during a given cycle.

Accordingly, what is needed is a blind spline broaching machine which incorporates workpiece handling equipment that enables the through-path of the workpieces to be altered, such that workpieces can be loaded and unloaded at a single loading/unloading station, so as to necessitate only a single delivery and return conveyor system.

SUMMARY OF THE INVENTION

According to the present invention there is provided a blind spline broaching machine for machining splines as well as sprockets, keyways, gears, cams and contours on a workpiece, such as a shaft. The blind spline broaching machine incorporates a single loading/unloading station at which workpieces are alternately loaded onto and unloaded from a platform. Because the workpieces are loaded and unloaded from the same location along the periphery of the blind spline broaching machine indexing table, the side of the blind spline broaching machine opposite the loading/unloading station remains open to permit ready access to the tooling and the interior structure of the blind spline broaching machine. In addition, only one conveyor system is required to transport workpieces to and from the blind spline broaching machine. As a result, the complexity of and the floor space required for the blind spline broaching machine is substantially reduced.

The blind spline broaching machine of this invention includes a platform having a number of peripheral stations, several of which are receptacles for receiving a number of workpieces, while at least one, and preferably several, house machining elements, such as an internal or external broach. The blind spline broaching machine also includes a pair of fixturing members, such as a pair of hydraulic rams, which are positioned over the platform so as to be simultaneously aligned with two of the stations on the platform. The fixturing members each have a suitable gripping device for securing a workpiece to the fixture member. The fixturing members are movable relative to the platform such that, when one of the fixturing members is actuated while in alignment with one of the machining elements, work is performed by the machining element on the workpiece secured to the fixturing member. The blind spline broaching machine also includes a suitable method for transporting each of the workpieces to and from the fixturing members. Preferably, this method entails indexing the platform to transport the workpieces around the blind spline broaching machine while nested in one of the receptacles provided in the platform.

In order to allow the use of a single loading/unloading station, the blind spline broaching machine of this invention includes a device for repositioning the workpieces in the receptacles on the platform. To illustrate, the platform may have four receptacles within which workpieces may reside. During loading, only two unmachined workpieces are placed in two of the four receptacles. The platform is then indexed until the first of the pair of fixturing members is aligned with one of the two vacant receptacles, at which time a machined workpiece from the previous cycle is unloaded from the first fixturing member and deposited into the vacant receptacle. The platform is then again indexed until one of the two unmachined workpieces is aligned with the first fixturing member, at which time the unmachined workpiece is gripped by the first fixturing member and readied for broaching.

Further indexing of the platform brings the remaining unmachined workpiece and the machined workpiece to the repositioning device. The repositioning device switches the unmachined and machined workpieces, such that a vacant receptacle and the unmachined workpiece will be aligned with the second fixturing member upon further indexing of the platform. The platform is then indexed until the vacant receptacle is aligned with the second fixturing member, at which time a second machined workpiece from the previous cycle is unloaded from the second fixturing member and deposited into the vacant receptacle. The platform is then again indexed to align the remaining unmachined workpiece with the second fixturing member, at which time the unmachined workpiece is gripped by the second fixturing member and readied for broaching. The platform now holds two machined workpieces, which can be transported to the loading/unloading station with further indexing of the platform.

According to a preferred aspect of this invention, the repositioning device permits the workpieces to be properly placed on the platform so that a vacant receptacle is always presented first to the fixturing devices to receive a machined workpiece, after which an unmachined workpiece is presented to the fixturing device to permit the loading of the unmachined workpiece onto the fixturing device. As a result, machined workpieces need not be immediately off-loaded prior to loading an unmachined workpiece, allowing for all unmachined workpieces to be loaded and all machined workpieces to be unloaded at a single loading/unloading station.

Several advantages of the present invention arise from this single loading/unloading feature. By loading and unloading all of the workpieces at a single location on the blind spline broaching machine, the side of the blind spline broaching machine opposite the loading/unloading station is open to permit access to the internal components of the machine. Also, the automated conveyor system necessary to deliver workpieces to and from the machine is greatly simplified, which significantly reduces the floor space required to accommodate the machine and its conveyor system.

Accordingly, it is an object of the present invention to provide a machining apparatus, such as a broaching machine, which is constructed to permit workpieces to be loaded onto and unloaded from the machining apparatus at a single loading/unloading station.

It is a further object of the invention that the machining apparatus accommodate the simultaneous machining of several workpieces to enhance efficiency and promote a high-speed, high-volume precision machining operation.

It is still a further object of the invention that the machining apparatus include a repositioning device which permits workpieces to be repositioned while loaded in the machining apparatus such that unmachined workpieces are presented for machining while machined workpieces are set aside for unloading.

It is another object of the invention that the machining apparatus include a simplified conveyor system for delivering unmachined workpieces and carrying away machined workpieces, such that floor space requirements of the machining apparatus are minimized.

It is yet another object of the invention that the single loading/unloading station of the machining apparatus be able to accommodate additional handling devices, such as those necessary to handle arbors upon which workpieces are precisely supported during the machining operation.

Other objects and advantages of this invention will be more apparent after a reading of the following detailed description taken in conjunction with the drawings provided.

BRIEF DESCRIPTION OF THE DRAWINGS

FIGS. 3 through 10 are schematic overhead views illustrating the primary operating sequences of the blind spline broaching machine of FIG. 1.

DETAILED DESCRIPTION OF THE PREFERRED EMBODIMENT

Figure 1:
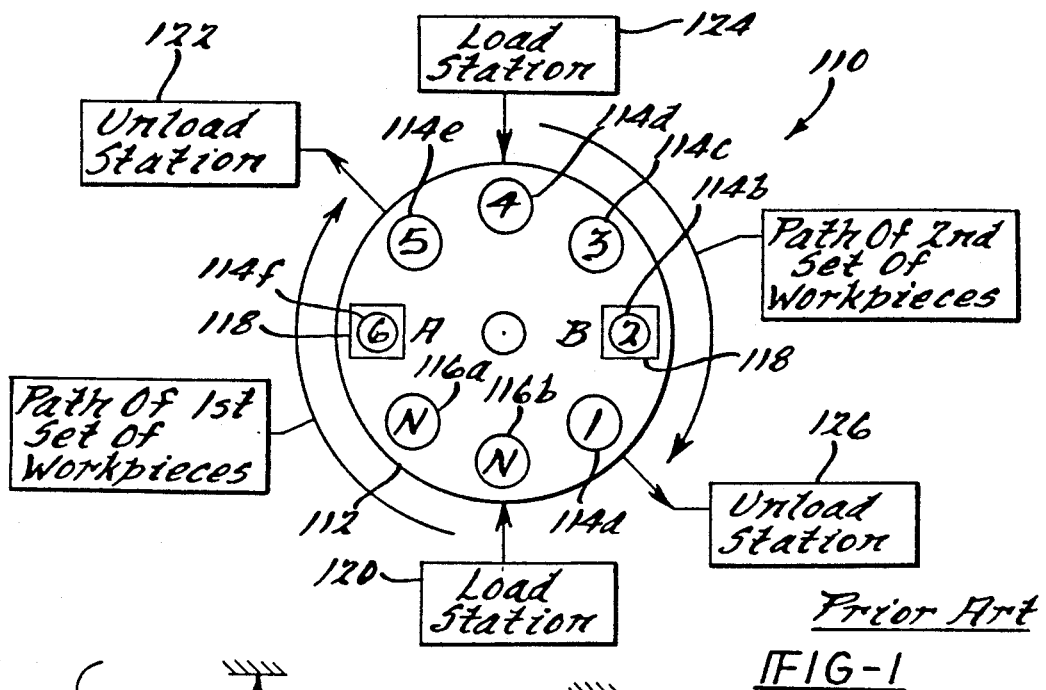
FIG. 1 is a schematic overhead view of a blind spline broaching machine known in the prior art.
Figure 2:
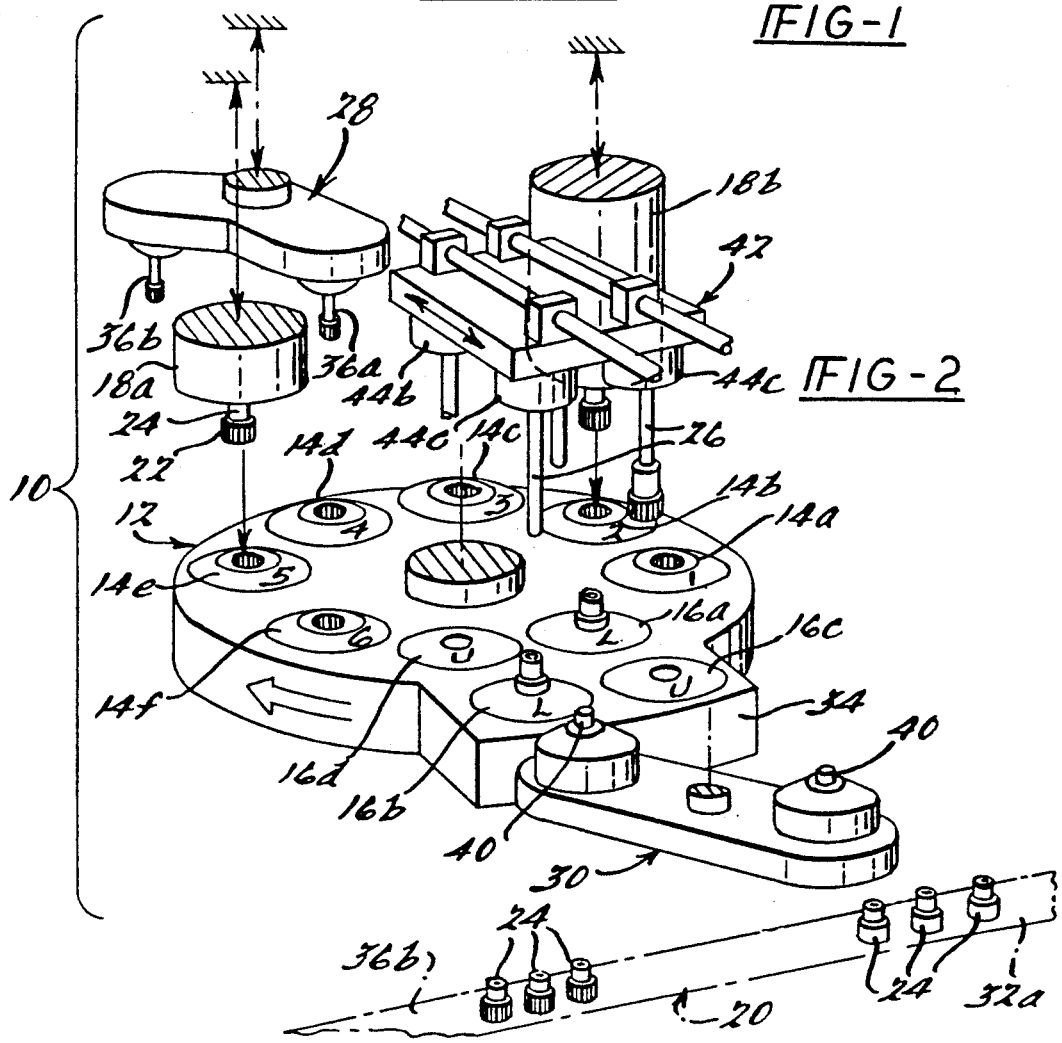
FIG. 2 is a partial perspective view of a blind spline broaching machine in accordance with the preferred embodiment of this invention.

With reference to FIG. 2, there is shown a partial perspective view of a dual-ram, rotary blind spline broaching machine 10 in accordance with the present invention. As illustrated, the blind spline broaching machine 10 is intended to be used in the machining of splines as well as sprockets, keyways, gears, cams and contours on workpieces which cannot be passed completely over or through a conventional broach. The broaching operation shown in FIG. 2 is illustrated to be that for forming an external spline 22 on a shaft 24. However, it will be apparent to those skilled in the art that the teachings of the present invention are not limited to forming external splines, but are also applicable to forming internal splines or any other precision feature on workpieces having any one of a variety of geometric forms.

The blind spline broaching machine 10 shown in FIG. 2 is shown in fragmentary form to better illustrate the primary features of this invention. However, one skilled in the art will recognize that these features can be incorporated to form a unitary machine which can stand alone on a plant floor. Furthermore, it will be apparent that the actual construction of the blind spline broaching machine 10 is not critical as long as it adopts the features described below to carry out the principles of this invention.

The blind spline broaching machine 10 generally includes a rotary dial platform or table 12, a pair of rams 18a and 18b, a part moving unit 28, an arbor handling unit 30, a loader/unloader 42, and a conveyor system having a delivery conveyor 32a and a return conveyor 32b. The arbor handling unit 30 is located at a loading/unloading station 20 of the blind spline broaching machine 10 between the rotary dial table 12 and the conveyor system 32a and 32b, while the part moving unit 28 is preferably located diametrically opposite the arbor handling unit 30. The loader/unloader 42 is horizontally movable between the rotary dial table 12, the arbor handling unit 30, and the conveyors 32a and 32b for transferring shafts 24 therebetween. The rams 18a and 18b can be conventionally supported by a span bridge (not shown) and reciprocated in a direction perpendicular to the rotary dial table 12 by any conventional device, such as a pair of hydraulic cylinders (not shown).

The rotary dial table 12 is preferably disc-shaped with a radial extension 34. As shown, the rotary dial table 12 has ten stations designated on its upper surface. Six of the stations carry broaching tools 14a through 14f, which are progressively sized such that each broaching tool 14a through 14f removes a specified amount of metal from the shaft 24. By successively moving the shaft 24 into the broaching tools 14a through 14f, the final form of the splines 22 can be achieved on the shaft 24.

The four remaining stations are nests 16a through 16d for receiving the shafts 24 on a corresponding number of arbors 26. Two of the four nests 16a and 16b are loading nests, while the remaining two nests 16c and 16d are unloading nests. The loading nests 16a and 16b receive unmachined shafts 24 from the delivery conveyor 32a and deliver them to the rams 18a and 18b, while the unloading nests 16c and 16d carry machined shafts 24 from the rams 18a and 18b to the return conveyor 32b. As can be seen, the loading nests 16a and 16b are diagonally opposite each other, as are the unloading nests 16c and 16d. In addition, the loading nest 16a is located radially inward from the unloading nest 16c, while the unloading nest 16d is located radially inward from the loading nest 16b. The purpose for this arrangement will become apparent after further discussion of the operation of the blind spline broaching machine 10.

Between each successive operating sequence of the blind spline broaching machine 10, the rotary dial table 12 is rotated, or indexed, a circumferential distance equivalent to the circumferential distance between an adjacent pair of stations on the rotary dial table 12. Any conventional mechanism (not shown) can be used to provide this incremental rotation of the rotary dial table 12 and, therefore, is not a critical feature of this invention. Each index of the rotary dial table 12 is followed by the actuation of at least one, and preferably both, of the rams 18a and 18b in unison. The rams 18a and 18b are located relative to the rotary dial table 12 so as to be suspended over two of the stations on the rotary dial table 12. In a preferred embodiment, the rams 18a and 18b are located in the rear half of the circle defined by the rotary dial table 12, as illustrated by FIG. 2.

Operating between the rams 18a and 18b is the part moving unit 28. In the preferred embodiment, the part moving unit 28 includes two downwardly-extending spindles 36a and 36b which are each sized to receive a shaft 24 and its arbor 26. The spindles 36a and 36b are spaced apart from each other a distance equivalent to the radial distance between the radially inward nests 16a and 16d and the radially outward nests 16b and 16c. The part moving unit 28 is equipped with a suitable device (not shown) for gripping and removing the shafts 24 and arbors 26 from the rotary dial table 12. The part moving unit 28 is automated to pivot about a central axis so as to permit the part moving unit 28 to rotate at least 180 degrees. In combination with the indexing of the rotary dial table 12, this maneuver permits a shaft 24 located in a radially outward nest, such as the loading nest 16b, to be repositioned to a radially inward nest, such as the loading nest 16a.

To facilitate the efficient handling of the loading and unloading operations at the loading/unloading station 20, the arbor handling unit 30 is provided between the rotary dial table 12 and the conveyor system 32a and 32b. The arbor handling unit 30 has a pair of upwardly-extending spindles 40 which are each sized to receive an arbor 26. The arbor handling unit 30 is also automatically pivotable about its central axis between a first diagonal position oriented to receive arbors 26 coming off shafts 24 being removed from the unloading nests 16c and 16d, and a second diagonal position oriented for delivering arbors 26 to shafts 24 being delivered to the loading nests 16a and 16b. The principles of this operation will be more fully explained below.

By providing the arbor handling unit 30, both the machined and unmachined shafts 24 can be removed from the delivery conveyor 32a and placed onto the return conveyor 32b without complications created by the presence of an arbor 26. However, those skilled in the art will readily recognize that not all machining operations within the scope of the blind spline broaching machine 10 will require arbors 26, and thus an arbor handling unit 30. Accordingly, the arbor handling unit 30 is an optional feature disclosed in accordance with the preferred embodiment of this invention.

For moving the shafts 24 between the rotary dial table 12 and the conveyors 32a and 32b, the loader/unloader 42 is provided to be horizontally movable between the rotary dial table 12, the arbor handling unit 30, and the delivery and return conveyors 32a and 32b. The loader/unloader 42 is also vertically movable over the rotary dial table 12, the arbor handling unit 30, and the delivery and return conveyors 32a and 32b to pick and place the shafts 24. The loader/unloader 42 is automated to pivot about its central axis so as to permit the loader/unloader 42 to rotate at least 180 degrees at predetermined times during the operation of the blind spline broaching machine 10. The loader/unloader 42 has a first pair of downwardly-projecting chucks 44a and 44b by which unmachined shafts 24 are delivered from the delivery conveyor 32a to the loading nests 16a and 16b, and a second pair of downwardly-projecting chucks 44c and 44d which remove machined shafts 24 from the unloading nests 16c and 16d and deliver them to the return conveyor 32b. The placement of the chucks 44a through 44d on the loader/unloader 42 is the same as the placement of the nests 16a through 16d on the rotary dial 12, so as to permit the simultaneous alignment of each chuck 44a through 44d with a corresponding nest 16a through 16d during a loading/unloading operation.

The preferred operation of the blind spline broaching machine 10 of this invention is illustrated in FIGS. 3 through 10. As shown, the rotation of the rotary dial table 12 is clockwise, though this direction of rotation is not necessary for purposes of this invention. While described as a preferred sequence of operations, the timing between each operation and the synchronization of some of the operations are not critical to carry out the primary features of this invention.

FIG. 3 shows the rotary dial table 12 immediately after being indexed to the loading/unloading station 20, with the nests 16a through 16d with broaching tools 14e and 14b, respectively. The loader/unloader 42 is raised to a position over the radial extension 34 of the rotary dial table 12. A pair of machined shafts 24 with their arbors 26 are located in the unloading nests 16c and 16d of the rotary dial table 12, while a pair of unmachined shafts 24 with their arbors 26 are located on the chucks 44a and 44b of the loader/unloader 42. The arbor handling unit 30 is oriented in the diagonal position shown.

Preferably, the loader/unloader 42 is lowered to deliver the unmachined shafts 24 and their arbors 26 to the loading nests 16a and 16b and retrieve the machined shafts 24 and their arbors 26 from the unloading nests 16c and 16d, while the rams 18a and 18b are also lowered to perform work on their two respective shafts 24. It should be noted that the shaft 24 in the ram 18a is undergoing its fifth broaching operation with the broaching tool 14e, while the shaft 24 in the ram 18b is undergoing its second broaching operation with the broaching tool 14b. While the loader/unloader 42 is in the lowered position, the machined shafts 24 and their arbors 26 are removed from the unloading nests 16c and 16d and locked into the chucks 44c and 44d of the loader/unloader 42, while the unmachined shafts 24 and their arbors 26 are placed in the loading nests 16a and 16b by the chucks 44a and 44b. Thereafter, the rams 18a and 18b and the loader/unloader 42 are simultaneously raised in preparation for the indexing of the rotary dial table 12.

The rotary dial table 12 is then indexed one station to the position shown in FIG. 4, aligning the rams 18a and 18b with the broaching tools 14f and 14c, respectively. The loader/unloader 42 is repositioned to be over the arbor handling unit 30. The loader/unloader 42 and the rams 18a and 18b are again lowered in unison. The loader/unloader 42 is lowered to deliver the arbors 26 only in the chucks 44c and 44d to the spindles 40 of the arbor handling unit 30, while the rams 18a and 18b are lowered to perform work on their two respective shafts 24. The loader/unloader 42 and the rams 18a and 18b are then raised together, the loader/unloader 42 having left the arbors 26 in the arbor handling unit 30 while retaining the shafts 24 in the chucks 44c and 44d.

The rotary dial table 12 is again indexed one station to the position shown in FIG. 5, aligning the rams 18a and 18b with the unloading nest 16d and the broaching tool 14d, respectively, and the loader/unloader 42 is repositioned such that the chuck 44a is over the delivery conveyor 32a and the chuck 44d is over the return conveyor 32b. Again, the loader/unloader 42 and the rams 18a and 18b are lowered in unison. The loader/unloader 42 is lowered to deliver the machined shaft 24 from the chuck 44d to the return conveyor 32b and to load an unmachined shaft 24 from the delivery conveyor 32a into the chuck 44a. The ram 18a is lowered to deliver a newly machined shaft 24 to the unloading nest 16d, and the ram 18b is lowered to perform work on its shaft 24 with the broaching tool 14d. The loader/unloader 42 and the rams 18a and 18b are then raised together, the loader/unloader 42 having left behind the machined shaft 24 from the chuck 44d on the return conveyor 32b and the loader/unloader 42 having picked up a new shaft 24 in the chuck 44a from the delivery conveyor 32a and the ram 18a having left behind a newly machined shaft 24 in the unloading nest 16d.

After indexing the rotary dial table 12 to another station to the position shown in FIG. 6, the rams 18a and 18b are now aligned with the loading nest 16a, which contains an unmachined shaft 24, and the broaching tool 14e, respectively. In addition, the unloading nest 16d, containing the newly machined shaft 24, is now aligned with the innermost spindle 36a of the part moving unit 28, and the loading nest 16b, containing an unmachined shaft 24, is aligned with the outermost spindle 36b. The loader/unloader 42 has also been indexed 180 degrees, such that the chuck 44b is now over the delivery conveyor 32a and the chuck 44c is now over the return conveyor 32b. It is also preferred to index the arbor handling unit 30 at this time to its diagonally opposite orientation, as indicated in FIG. 6.

The loader/unloader 42, the rams 18a and 18b, and the part moving unit 28 are all lowered in unison. The loader/unloader 42 is lowered to deliver the machined shaft 24 from the chuck 44c to the return conveyor 32b and to load an unmachined shaft 24 from the delivery conveyor 32a into the chuck 44b. The ram 18a is lowered to pick up the unmachined shaft 24 from the loading nest 16a, and the ram 18b is lowered to perform work on its shaft 24 with the broaching tool 14e. The part moving unit 28 is lowered to secure the machined shaft 24 to its innermost spindle 36a while its outermost spindle 36b is secured to the unmachined shaft 24 positioned in the loading nest 16b. The loader/unloader 42, the rams 18a and 18b, and the part moving unit 28 are then raised together, the loader/unloader 42 having left the machined shaft 24 on the return conveyor 32b and picked up a new unmachined shaft 24 in the chuck 44b.

Figure 7:
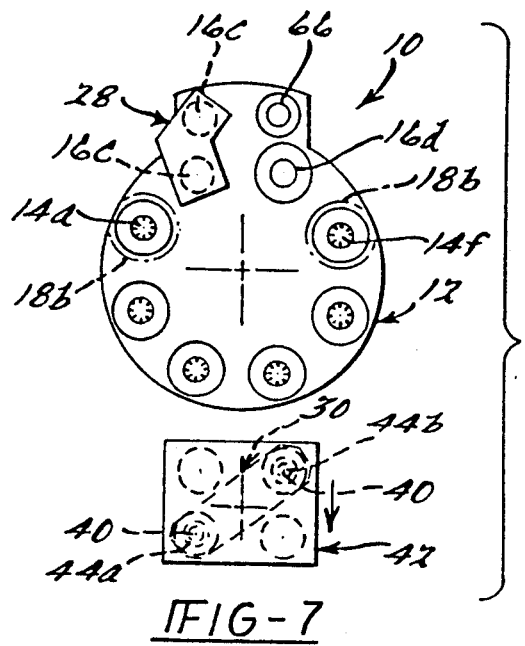

The rotary dial table 12 and the part moving unit 28 are then indexed another station, as shown in FIG. 7, with the rams 18a and 18b aligned with the broaching tools 14a and 14f, respectively. The part moving unit 28 has been indexed to align the unmachined shaft 24 over the loading nest 16a and the machined shaft 24 over the unloading nest 16c. In addition, the loader/unloader 42 has moved to a position over to the arbor handling unit 30, with the unmachined shafts 24 in the chucks 44a and 44b being aligned with the arbors 26 on the spindles 40 of the arbor handling unit 30.

As before, the loader/unloader 42, the rams 18a and 18b, and the part moving unit 28 are all lowered in unison. The loader/unloader 42 is lowered to engage the pair of arbors 26 on the arbor handling unit 30 with the unmachined shafts 24 on the chucks 44a and 44b. The rams 18a and 18b are lowered to perform work on their two respective shafts 24 with broaching tools 14a and 14f, respectively. The part moving unit 28 is lowered to place the unmachined shaft 24 in the loading nest 16a and to place the machined shaft 24 in the unloading nest 16c.

The loader/unloader 42, the rams 18a and 18b, and the part moving unit 28 are then raised together, the loader/unloader 42 now having the unmachined shafts 24 and their arbors 26 locked in the chucks 44a and 44b. The part moving unit 28, loading nest 16b and unloading nest 16d no longer hold any shafts 24.

Figure 8:
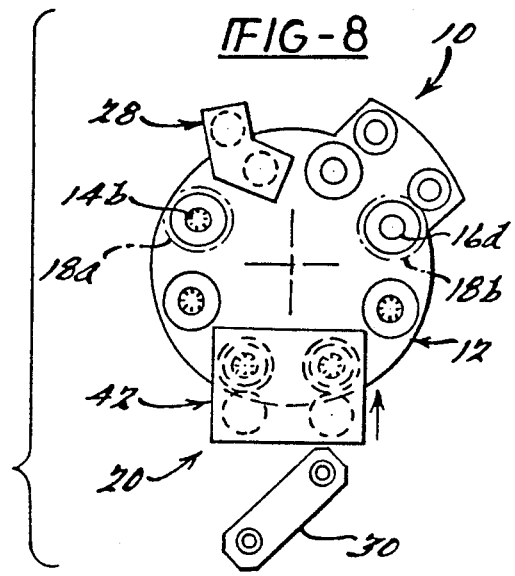

The rotary dial table 12 is again indexed one station to the position shown in FIG. 8, aligning the rams 18a and 18b with the broaching tool 14b and the unloading nest 16d (which is vacant), respectively. The loader/unloader 42 is repositioned to the loading/unloading station 20 of the blind spline broaching machine 10. The rams 18a and 18b are lowered in unison, with the ram 18b delivering a newly machined shaft 24 and its arbor 26 to the unloading nest 16d, and the ram 18a being lowered to perform work on its shaft 24 with the broaching tool 14b. The rams 18a and 18b are then raised together, the ram 18b having left behind the newly machined shaft 24 and its arbor 26 in the unloading nest 16d.

Figure 9:
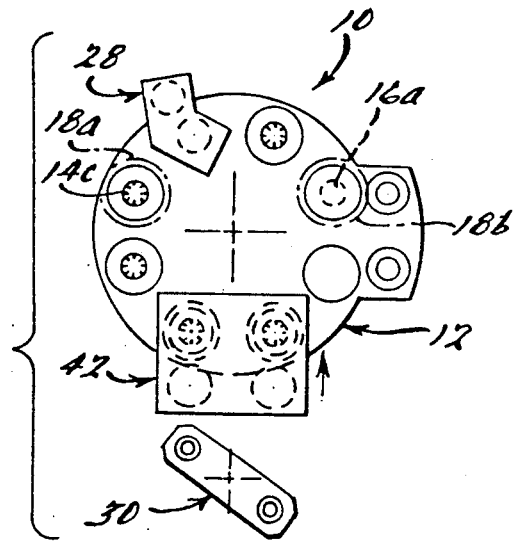

The rotary dial table 12 is then indexed one additional station to the position shown in FIG. 9, such that the rams 18a and 18b are now aligned with the broaching tool 14c and the loading nest 16a, respectively. At this time, it is also preferable to index the arbor handling unit 30, as shown. The loading nest 16a contains an unmachined shaft 24, which was previously transferred from the loading nest 16b by the part moving unit 28. The rams 18a and 18b are lowered in unison, with the ram 18a being lowered to perform work on its shaft 24 with the broaching tool 14c, and the ram 18b being lowered to pick up the unmachined shaft 24 from the loading nest 16a. The rams 18a and 18b are then raised.

Figure 10:
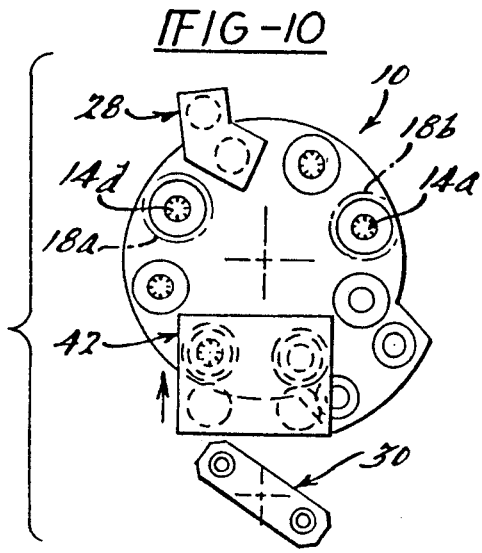

The rotary dial table 12 is again indexed a station to the position shown in FIG. 10, with the rams 18a and 18b aligned with the broaching tools 14d and 14a, respectively. The rams 18a and 18b are then lowered to perform work on their respective shafts 24, and then raised. The rotary dial table 12 is then indexed to its original position, shown in FIG. 3, with the nests 16a through 16d being positioned adjacent the arbor handling unit 30 at the loading/unloading station 20. From the previous cycle, machined shafts 24 are located in both of the unloading nests 16c and 16d. The loader/unloader 42 is positioned over the radial extension 34 of the rotary dial table 12, and holds the pair of unmachined shafts 24 with their arbors 26 in its chucks 44a and 44b. As described beginning with the discussion of FIG. 3, the loader/unloader 42 is then lowered to deliver the unmachined shafts 24 and arbors 26 to the loading nests 16a and 16b and retrieve the machined shafts 24 and arbors 26 from the unloading nests 16c and 16d. The complete cycle is then repeated.

From the above description of the operation of the blind spline broaching machine 10 of this invention, it can be seen that the part moving unit 28 provides a significant advantage in workpiece flow through the blind spline broaching machine 10. In particular, the part moving unit 28 enables the unmachined and machined shafts 24 to be properly positioned in the nests 16a through 16d on the rotary dial 12, such that the unloading nest 16d is always vacant when presented to the rams 18a and 18b. The unloading nest 16d is also the first nest to encounter the rams 18a and 18b, such that a newly machined shaft 24 can be deposited into the unloading nest 16d prior to loading the next unmachined shaft 24 from the loading nest 16a.

In addition, the part moving unit 28 ensures that the loading nest 16a presents an unmachined shaft 24 to the rams 18a and 18b immediately after the previous machined shafts 24 has been deposited into the unloading nest 16d. As a result, machined shafts 24 need not be immediately off-loaded from the rotary dial table 12 before loading an unmachined shaft 24. Each of these capabilities allows for all of the unmachined shafts 24 to be loaded and all of the machined shafts 24 to be unloaded at the single loading/unloading station 20 of the blind spline broaching machine 10.

A significant advantage of the single-point loading-/unloading feature of this invention is that, by loading and unloading all of the shafts 24 at the loading/unloading station 20, the side of the blind spline broaching machine 10 opposite the loading/unloading station 20 is substantially open to permit access to the internal components of the machine, such as the broaching tools 14a through 14f and the rams 18a and 18b. As a result, both set-up and maintenance of the blind spline broaching machine 10 is significantly made easier.

Another significant advantage of the present invention is that the conveyor system used to deliver the shafts 24 to and from the blind spline broaching machine 10 is greatly simplified. Specifically, there is no need for two separate conveyor systems, each having its own delivery and return route, located on opposite sides of the machine. According to this invention, only one conveyor system, having delivery and return conveyors 32a and 32b located on the same side of the blind spline broaching machine 10, is necessary to supply workpieces to both of the rams 18a and 18b. As a result, the floor space required to accommodate the blind spline broaching machine 10 and its conveyor system is greatly reduced. In addition, access to the blind spline broaching machine 10 and its interior components is also promoted due to the elimination of a conveyor system on the back side of the machine.

Further, the advantages of the blind spline broaching machine 10 can be realized with different types of machining operations and tooling, and is in no way limited to the dual ram rotary blind spline broaching operation described above.

Therefore, while the invention has been described in terms of a preferred embodiment, it is apparent that other forms could be adopted by one skilled in the art. For example, the arbor handling unit 30 could be eliminated entirely for machining workpieces that do not require locating on an arbor. Additionally, other means for transporting the shafts 24 through the blind spline broaching machine 10 could be readily adopted by those skilled in the art to achieve the transfer of workpieces between the nests 16a through 16d and the rams 18a and 18b, as described. Accordingly, the scope of the invention is to be limited only by the following claims.

What is claimed is:

1. An apparatus for performing work on a plurality of workpieces during a single operation, said apparatus comprising:
    a table having receptacles for receiving said plurality of workpieces, said table having at least one machining element;
    first and second fixturing members positioned in proximity to said table, said first and second fixturing members each having means for securing thereto a respective one of said plurality of workpieces, said first and second fixturing members being movable relative to said at least one machining element on said table so as to perform work on said respective one of said plurality of workpieces;
    means associated with said table for transporting each of said plurality of workpieces to said first and second fixturing members; and
    means associated with said table for repositioning a second workpiece of said plurality of workpieces on said table after a first workpiece of said plurality of workpieces has been secured to said first fixturing member, said second workpiece being repositioned on said table so as to be aligned to encounter said second fixturing member;
    whereby at least two workpieces of said plurality of workpieces can be secured in said first and second fixturing members during the operation of said apparatus.

2. The apparatus of claim 1 wherein said table is a rotary member which is rotatable relative to said first and second fixturing members so as to comprise said means for transporting said plurality of workpieces.

3. The apparatus of claim 1 further comprising means for loading and unloading each of said plurality of workpieces to and from said table at a single station of said apparatus.

4. The apparatus of claim 1 wherein said receptacles for receiving said plurality of workpieces comprise four nests located on said table.

5. The apparatus of claim 4 wherein said first workpiece is loaded into a first nest of said four nests and said second workpiece is loaded into a second nest of said four nests, said first and second nests comprising loading nests of said table.

6. The apparatus of claim 5 wherein said repositioning means moves said second workpiece from said second nest to said first nest after said first workpiece has been secured to said first fixturing member.

7. A broaching apparatus for machining a plurality of workpieces during a single operation, said broaching apparatus comprising:
    a rotary member having receptacles for receiving said plurality of workpieces, said rotary member having at least one machining element;
    a single station on said broaching apparatus for loading and unloading said plurality of workpieces to and from said rotary member;
    first and second fixturing members positioned in proximity to said rotary member, said first and second fixturing members each having means for securing thereto a respective one of said plurality of workpieces;
    means engaged with said rotary member for rotating said rotary member so as to transport each of said plurality of workpieces to and from said first and second fixturing members and to and from said single station;
    means in communication with said first and second fixturing members for relative movement between each said first and second fixturing members and said at least one machining element so as to perform work on said respective one of said plurality of workpieces when secured to a respective one of said first and second fixturing members; and
    means associated with said rotary member for repositioning a second workpiece of said plurality of workpieces on said rotary member after a first workpiece of said plurality of workpieces has been secured to said first fixturing member, said second workpiece being repositioned on said rotary member so as to be aligned to encounter said second fixturing member;
    whereby work can be simultaneously performed on said first and second workpieces when said first and second workpieces are secured in said first and second fixturing members, respectively.

8. The broaching apparatus of claim 7 further comprising means for loading and unloading each of said plurality of workpieces to and from said rotary member at said single station of said broaching apparatus.

9. The broaching apparatus of claim 7 wherein said receptacles for receiving said plurality of workpieces comprise four nests located on said rotary member.

10. The broaching apparatus of claim 9 wherein said first workpiece is loaded into a first nest of said four nests and said second workpiece is loaded into a second nest of said four nests at said single station, said first and second nests comprising loading nests of said rotary member.

11. The broaching apparatus of claim 10 wherein said repositioning means moves said second workpiece from said second nest to said first nest after said first workpiece has been secured to said first fixturing member.

12. The broaching apparatus of claim 11 wherein said first nest is located radially inward relative to said second nest on said rotary member.

13. The broaching apparatus of claim 11 further comprising means for positioning a machined workpiece in a third nest of said four nests after said first workpiece has been secured to said first fixturing member, said third nest being located radially outward from said first nest on said rotary member.

14. The broaching apparatus of claim 7 wherein said broaching apparatus is a blind spline broaching machine.

15. The broaching apparatus of claim 7 further comprising:
removable arbors on said rotary member for locating said plurality of workpieces in said receptacles; and
means located at said single station for receiving said removable arbors from said rotary member as said first and second workpieces are removed from said rotary member.

16. The broaching apparatus of claim 15 wherein said receiving means for said removable arbors is pivotable between a loading position and an unloading position.

17. A method for loading and unloading a plurality of workpieces to and from a machining apparatus having at least two fixturing members and a rotary member which supports at least one machining element, said method comprising the steps of:
loading each of said plurality of workpieces onto said rotary member at a load/unload station of said machining apparatus, a first workpiece of said plurality of workpieces being loaded in a first nest and a second workpiece of said plurality of workpieces being loaded in a second nest on said rotary member;
transporting said first and second workpieces to a first fixturing member of said at least two fixturing members;
unloading a first machined workpiece from said first fixturing member into a third nest on said rotary member;
securing said first workpiece to said first fixturing member;
loading said second workpiece into said first nest and relocating said first machined workpiece to a fourth nest on said rotary member;
performing work on said first workpiece with said at least one machining element;
transporting said second workpiece to a second fixturing member of said at least two fixturing members;
unloading a second machined workpiece from said second fixturing member into said third nest;
securing said second workpiece to said second fixturing member;
performing work on said second workpiece with said at least one machining element;
transporting said first and second machined workpieces to said load/unload station; and
unloading said first and second machined workpieces from said rotary member at said load/unload station.

18. The method of claim 17 wherein said steps of performing work on said first and second workpieces include moving said first and second fixturing members relative to said at least one machining element.

19. The method of claim 17 wherein each of said transporting steps includes rotating said rotary member relative to said first and second fixturing members.

20. The method of claim 17 wherein said step of loading said second workpiece in said first nest and relocating said first machined workpiece to a fourth nest includes moving said second workpiece and said first machined workpiece with an interchanging device.

21. The method of claim 17, wherein said step of loading each of said plurality of workpieces onto said rotary member comprises:
mounting each of said plurality of workpieces onto an arbor located on an arbor receiving member; and
loading each of said plurality of workpieces with a corresponding arbor onto said rotary member; and
wherein said step of unloading said first and second machined workpieces from said rotary member at said load/unload station comprises:
unloading said first and second machined workpieces with respective first and second arbors from said rotary member onto said arbor receiving member; and
removing said first and second machined workpieces from said arbor receiving member while said first and second arbors remain on said arbor receiving member.

* * * * *

UNITED STATES PATENT AND TRADEMARK OFFICE
CERTIFICATE OF CORRECTION

PATENT NO. : 5,315,750
DATED : May 31, 1994
INVENTOR(S) : Robert E. Roseliep

It is certified that error appears in the above-indentified patent and that said Letters Patent is hereby corrected as shown below:

Column 10, line 34, delete "shafts" insert ---- shaft ----.

Signed and Sealed this

Sixth Day of September, 1994

Attest:

BRUCE LEHMAN

*Attesting Officer*      *Commissioner of Patents and Trademarks*